United States Patent
Rice et al.

(10) Patent No.: US 6,822,172 B2
(45) Date of Patent: Nov. 23, 2004

(54) COMBINED VEHICLE SCALE THROUGH THE USE OF LATERAL CONNECTIONS

(75) Inventors: Thomas Rice, Columbus, OH (US); Zepu Liang, Grove City, OH (US); Steve Hamilton, Upper Arlington, OH (US)

(73) Assignee: Mettler-Toledo, Inc., Columbus, OH (US)

( * ) Notice: Subject to any disclaimer, the term of this patent is extended or adjusted under 35 U.S.C. 154(b) by 181 days.

(21) Appl. No.: 10/154,324

(22) Filed: May 23, 2002

(65) Prior Publication Data

US 2002/0189867 A1 Dec. 19, 2002

Related U.S. Application Data

(60) Provisional application No. 60/293,086, filed on May 23, 2001.

(51) Int. Cl.[7] .............................................. G01G 19/02
(52) U.S. Cl. ........................ 177/132; 177/133; 177/134
(58) Field of Search .............................. 177/132, 133, 177/134, 135, 199, 200

(56) References Cited

U.S. PATENT DOCUMENTS

| | | | | |
|---|---|---|---|---|
| 3,966,001 A | * | 6/1976 | Goldberg | .................... 177/133 |
| 4,554,987 A | * | 11/1985 | Dillon | ......................... 177/134 |
| 4,815,547 A | * | 3/1989 | Dillon et al. | ............. 177/25.14 |
| 4,828,055 A | * | 5/1989 | Hamilton et al. | ............ 177/134 |
| 5,308,933 A | * | 5/1994 | Ahl | .............................. 177/135 |
| 6,706,976 B1 | * | 3/2004 | Schuler | ...................... 177/126 |

FOREIGN PATENT DOCUMENTS

| | | | | | |
|---|---|---|---|---|---|
| GB | | 2127159 A | * | 4/1984 | ................. 177/133 |

* cited by examiner

*Primary Examiner*—Randy W. Gibson
(74) *Attorney, Agent, or Firm*—Jeffrey Furr

(57) ABSTRACT

The current invention involves a method and device of combining vehicle scales platforms to eliminate potential checking interferences. Disclosed is a novel method of combining independent scale platforms enabling independent weighing on each platform and at the same time a singular checking system for the combined scale. It involves utilizing three tie rod type links, which have been used in the past to combine scales longitudinally, and in the new invention, are used in the lateral direction. This reduces the complexity and associated cost of the combined scale checking system and increases the accuracy of said scale system by eliminating potential checking interferences. This is extremely significant in situations where side checking is inconvenient near where two scales connect, or in pit less and above ground scale designs.

8 Claims, 6 Drawing Sheets

-Prior Art-

—Prior Art—

FIG. 6A —Prior Art—

COMBINED VEHICLE SCALE THROUGH THE USE OF LATERAL CONNECTIONS

CROSS-REFERENCES TO RELATED APPLICATIONS (IF ANY)

Provisional Patent No. 60/293,086 filed May 23, 2001

STATEMENT AS TO RIGHTS TO INVENTION MADE UNDER FEDERALLY-SPONSORED RESEARCH AND DEVELOPMENT (IF ANY)

None

BACKGROUND

1. Field of the Invention

This invention relates to a weighing apparatus and, more particularly, to a multiple platform weighing apparatus utilizing a combined singular scale checking system.

2. Description of Prior Art

Many weighing applications such as large vehicle scales prefer the use of multiple platforms. A heavy capacity platform for weighing vehicles requires multiple load cells. Each load cell provides a signal proportional to the portion of the load borne by that load cell. In heavy capacity applications the load is usually distributed over at least four load cells and some applications may require sixteen or more load cells. The sum of the platform output signals must be obtained to provide a signal representative of the total weight applied to the scale "The weight accuracy of multiple load cell scales depends not only on the accuracy of the individual cells, but also on the mechanical and electrical interaction among them. Since the load cells usually have different sensitivities to applied loads each platform output must be made independent of the position of the weight on the platform. In addition, each platform output comprising the multiple platform scale must be made independent of the position of the weight on the scale. The outputs of the individual cells must therefore be compensated or adjusted so that the total scale output remains substantially the same for a given load no matter where on the scale It is positioned. Such load position compensation has usually been accomplished by connecting sensitivity reducing resistors in the wheatstone bridge circuit of the individual load cells, usually across the output of the bridge circuit. U.S. Pat. No. 4,804,052 discloses the "digital load cell" in which an analog-to-digital converter and microprocessor are dedicated to a single load cell."

"A large capacity weigh scale usually consists of multiple load cells. Typically a rocker pin, double sheer beam torsion ring type load cell is used. U.S. Pat. No. 4,815,547 to Dillon et al. discloses a typical rocker pin with a printed circuit board attached. A principal advantage of the rocker pin is that it can be made self-erecting, so that when the normally upright pin is deflected about its base or grounded end the pin will return to its upright position when the deflecting load is removed. The self-erecting feature is an advantage in weighing applications in which temporary side loads are encountered. Tho self-erecting feature is obtained by configuring the pin so that the radius of curvature of each end surface is greater than half the total height of the pin."

A common vehicle scale configuration often contains a number of independent scale platforms thereby allowing the determination of vehicle axle or axle group weights in addition to the gross vehicle weight. These scales have often been combined longitudinally (lengthwise) utilizing tie rod type links which is a device that fixes relative motion between two objects connected using a tie rod link only in the direction along the axis of the link. The relative motion between two bodies connected using tie rod links in another direction is not constrained or has been constrained with other means such as bumpers. These bumpers can cause a "live to dead" weight problem if the bumpers are touching the platform causing the weight to be inaccurate. This can be a very big problem with the buildup of debris and ice. Therefore, these longitudinally tie rod links do not help to limit potential side checking interference.

There is still room for improvement within the art.

1. Field of the Invention

2. Description of Related Art Including Information Disclosed Under 37 CFR § 1.97**> and 1.98<.

SUMMARY OF THE INVENTION

It is a general object of the present invention to substantially eliminate the problems described above associated with connecting a number of independent platforms comprising a multiple platform scale. A more particular object is to eliminate potential checking interferences.

The present invention consists of a weighting method and weighing apparatus which includes a number of independent platforms comprising a multiple platform scale that allows the determination of vehicle axle weights in addition to gross vehicle weight. The current invention is a novel method of combining independent platforms enabling independent weighing on each platform and at the same time a singular checking system of the combined scale. This invention involves utilizing three tie rod type links, which in prior art have commonly been used to combine scales only longitudinally (lengthwise), however in the current invention they are also attached in the lateral (widthwise) direction. This allows the platforms to remain independent and utilize a simple single checking system for all platforms comprising the multiple platform scale.

BRIEF DESCRIPTION OF THE DRAWING

Without restricting the full scope of this invention, the preferred form of this invention is illustrated in the following drawings:

FIG. 3 is a plain top view of the weighing apparatus embodying the present invention;

FIG. 6a displays the position of the bumpers in prior art. And,

PREFERRED EMBODIMENT

The preferred embodiment of the invention is a weighing apparatus and method consisting of a number of independent platforms that allow for the determination of vehicle axle weights in addition to gross vehicle weight. It is a novel method of combining independent scale platforms enabling independent weighing on each platform and at the same time utilizing a singular checking system of the combined scale. In the preferred embodiment, the current invention involves utilizing three tie rod type links, two which are used to combine platforms longitudinally (lengthwise) and one to combine the platforms in lateral (widthwise) direction.

Figure 1:
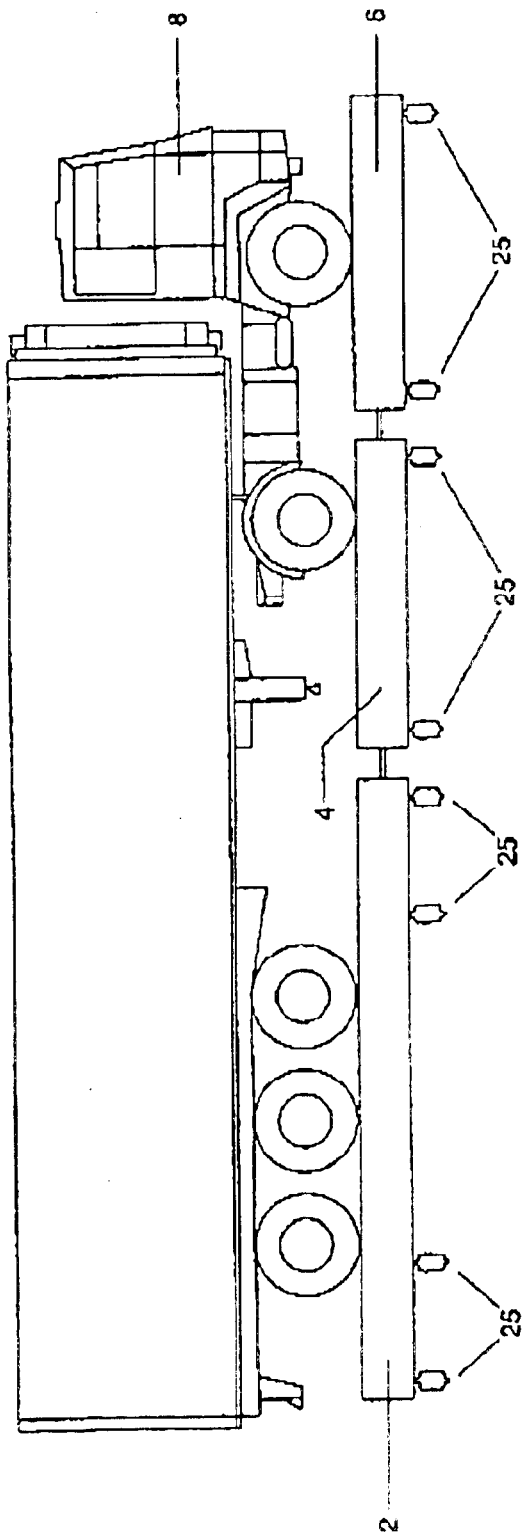
FIG. 1 is a plain view of a typical multi-platform weighing apparatus.

FIG. 1 displays a typical multiple platform scale. It has three platforms, 2, 4, and 6 with a truck 8 positioned on top of them for weighing. The truck is positioned so that each axle or axle group occupies a given platform and therefore the axle or axle group weights may be ascertained from the scale. The platforms are supported by a number of load cells 25.

Figure 2:
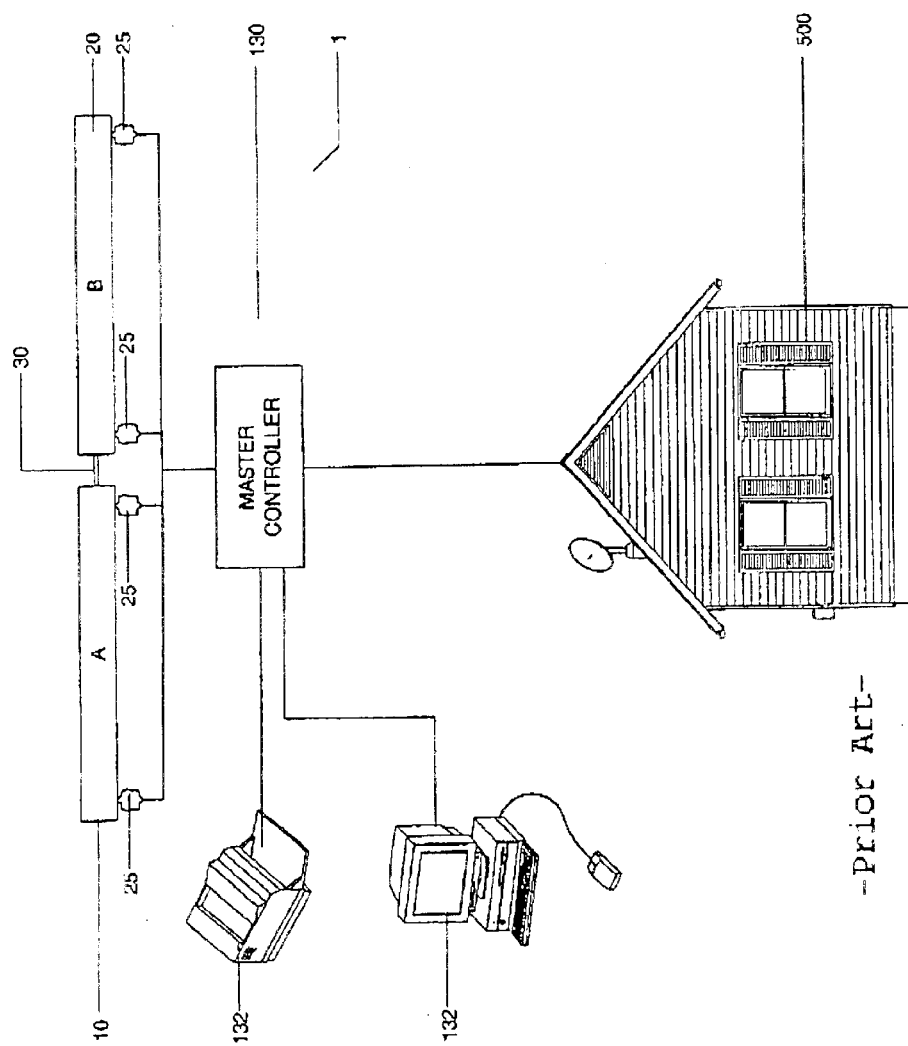
FIG. 2 is a plain side view of the weighing apparatus embodying the prior art.

The prior art is detailed in FIG. 2. There is shown configured as a single weighing apparatus with multiple platforms for weighing vehicles. The weighting apparatus 1 consists of Platform A 10 and Platform B 20 suitable for holding a vehicle such as a truck or a railroad car. This example includes eight load cells 25, with four load cells supporting each or the two platforms. Platform A 10 and Platform B 20, suitable for holding a vehicle such as a truck or a railroad car. The load cells 25 are connected together through a master controller 130. The master controller may be connected to one or more peripheral devices 132 such as a printer or host computer. The load cell 25 and master controller 130 are arranged and polled with master controller 130 performing as the master and the load cells 25 performing as slaves. The master controller 130 is usually contained in the control house 500. The master controller 130 is usually connected to the load cells 25 through use of a standard communication means such as cables.

The master controller 130 polls the load cell 25 (slaves) or selected load cell 25 as required. The load cell 25 responds by transmitting data or requesting information from the master controller 130.

In the arrangement of FIG. 2, each group of four or more digital load cells may constitute an individual scale so that the combined output of all load cells 25 in the group represents relevant weight data to be gathered and operated on by master controller 130 even though they are weighing different platforms. An example of such an application would be the assignment of each group to weigh one particular tank or bin, which could then be monitored and controlled by master controller 130 the network.

The master controller 130 polls all load cells 25 periodically and sums the weight data to obtain the weight of the object on the platforms 10 and 20.

"A large capacity weigh scale 1 usually consists of multiple load cells 25. Typically a rocker pin, double sheer beam, torsion ring type load cell is used. U.S. Pat. No. 4,815,347 to Dillon et al., incorporated by reference, discloses a typical rocker pin with a printed circuit board attached."

In current art, Platform A 10 and Platform B 20 are connected by two longitudinal force transfer linkages 30 to reduce checking errors. In the preferred embodiment, these force transfer linkages consist of tie rod links which is a device that fixes relative motion between two objects connected using a tie rod link only in the direction along the axis of the link. The relative motion between the two bodies connected using tie rod links in the other directions is not constrained.

Figure 3:
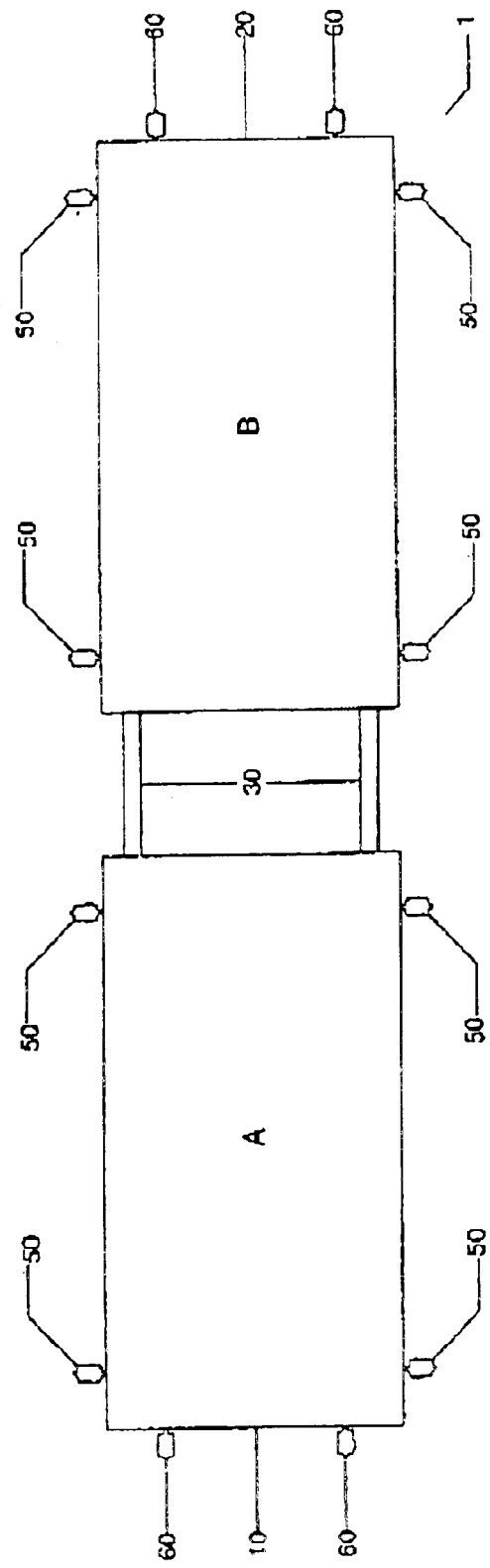
FIG. 3 is a plain top view of the weighing apparatus embodying the prior art.

In current art as shown in FIG. 3, the scales rest on four or more individual load cells 25. These load cells are positioned by or next to each corner and along the sides of the scale platform and consist of a typical rocker pin load cell. The scale has lateral bumpers 50 and longitudinal bumpers 60. The lateral bumpers 50 are placed two on each of the lateral sides of each platform near each of the ends to hold the platform in place and limit its motion. The longitudinal bumper 60 is placed near each of the ends of the longitudinal side. Common industry standard bumpers will be used. This is common set up in the industry.

Figure 4:
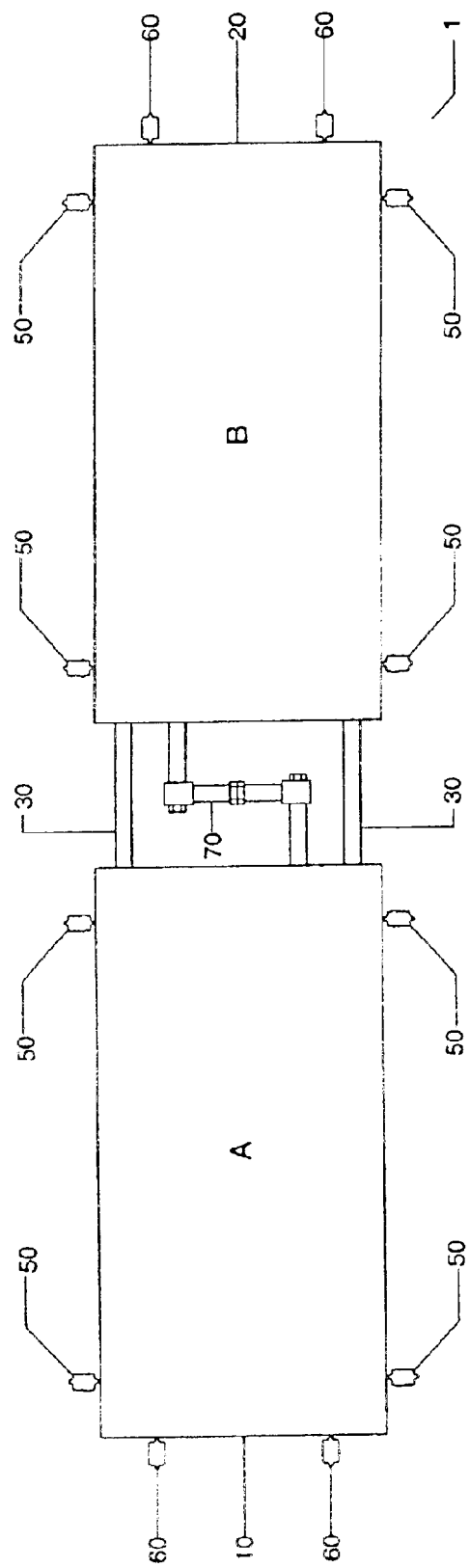

The current invention is shown in FIG. 4, and it has the same configuration as in FIG. 3, except that a lateral force transfer linkage 70 has been added to the weighing apparatus 1 and it has fewer lateral bumpers 50. It is also evident that the checking system employed for this multiple platform scale is identical to what would be the checking system had this configuration only employed a single platform. The lateral force transfer linkage 70 is connected to each of the platforms A 10 and B 20 to assist in the reduction of checking errors. In the preferred embodiment, this lateral force transfer linkage 70 consists of a tie rod link, where the tie rod is perpendicular to the lateral sides. This perpendicular orientation assists in the eliminating of checking interferences. The tie rod link is connected to the platform through industry standard means. These means include having each end of the tie rod connected to brackets by tie rods.

Figure 5A:
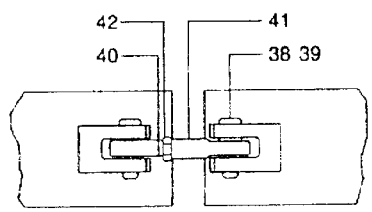
FIGS. 5a and 5b displays the force transfer linkage.
Figure 5B:
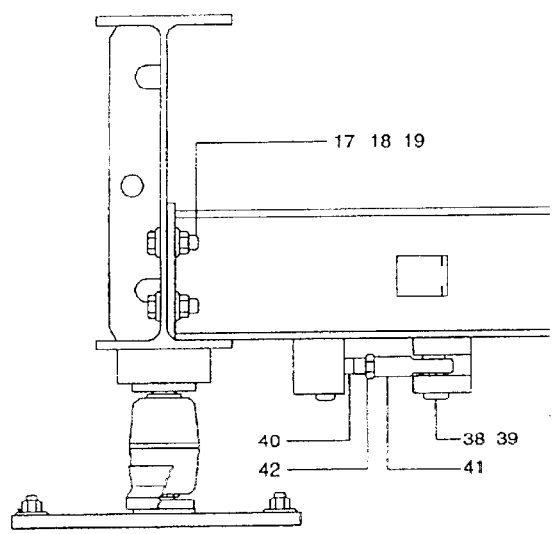

"FIG. 5 shows the force transfer linkages in more detail. FIG. 5A displays a longitudinal force transfer linkage 30. A multi-axle rod 41 is attached to two brackets 38 by clevis pins 39. There is one bracket 38 on each scale that are directly across from each other. The multi-axle rod 41 is in parallel with the lateral sides of the scale. FIG. 5B displays a lateral force transfer linkage 70. The brackets 38 on each scale are set facing each other but are offset by the length of the multi-axle rod 41. The multi-axle rod 41 is set perpendicular to the lateral sides of the scale. The brackets 38 are connected to the underside or the platform using industry standard methods such as welding. The brackets are perpendicular to the underside of the platform. The underside of the platform is the side that is connected to the load cells and the opposite side that the load is applied to."

Figure 6B:
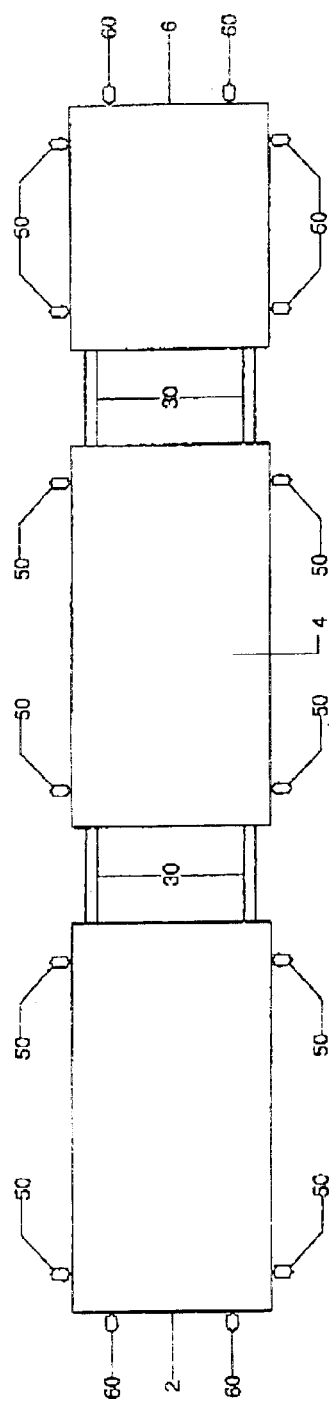
FIG. 6b displays the position of the bumpers in the current invention.
Figure 6B:
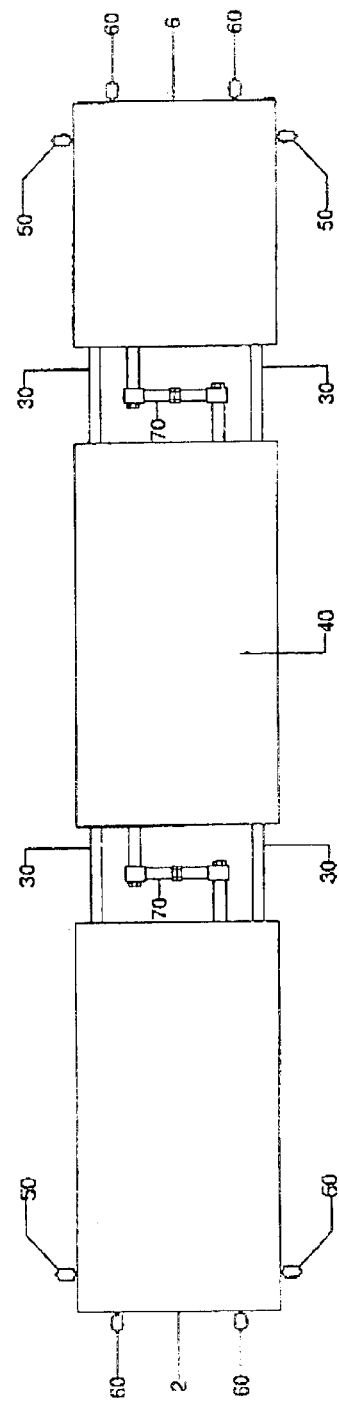

In preferred embodiment, the scales rest on four or more individual load cells 40. These load cells are positioned by or next to each corner and along the sides of the scale platform and consist of a typical rocker pin load cell. The scale has lateral bumpers 50 and longitudinal bumpers 60. The lateral bumpers 50 are placed two on each of the lateral sides of the scale 1 near each of the ends to hold the platform in place and limit its motion. The longitudinal bumper 60 is placed in the center of the longitudinal side. Common industry standard bumpers will be used. FIG. 6a displays the position of the bumpers in prior art and FIG. 6b displays the position of the bumpers in the current invention.

Advantages

The current invention assists the elimination of checking interferences that are a problem in the current method of combining vehicle scales. It helps to prevent any dead to live connections by eliminating side restraints that would be required without its use.

Conclusion, Ramifications, and Scope

Although the present invention has been described in considerable detail with reference to certain preferred versions thereof, other versions are possible. For example, a different type of force transfer linkage could be used, a different number of scales could be used, a different number of platforms could be used, or a different number of tie rod links could be used. The invention could also be used weighing applications other than vehicle weighing, where multiple platform configurations are desirable, such as in general industrial weighing, or tank weighing. Therefore, the point and scope of the appended claims should not be limited to the description of the preferred versions contained herein.

What is claimed is:

1. A weighing apparatus comprising:
   a plurality of platforms with a weighing means;
   said platforms connected through a longitudinal means; and
   said platforms connected through a lateral means where said lateral means is a non-linear shaped linkage.

2. A weighing apparatus according to claim 1 wherein the weighing means consists of
   multiple load cells.

3. A weighing apparatus according to claim 1 wherein the weighing means consists of multiple digital load cells.

4. A weighing apparatus according to claim 1 wherein the weighing means consists of:
   Multiple hydraulic load cells.

5. A weighing apparatus comprising:
   a plurality of platforms with a weighing means;
   said platforms connected through a longitudinal means; end
   said platforms connected through a lateral means where said lateral means is an"L" shaped linkage.

6. A weighing apparatus according to claim 5 wherein the weighing means consists of
   multiple load cells.

7. A weighing apparatus according to claim 5 wherein the weighing means consists of multiple digital load cells.

8. A weighing apparatus according to claim 5 wherein the weighing means consists of:
   Multiple hydraulic load cells.

* * * * *